(12) United States Patent
Munshi et al.

(10) Patent No.: US 7,850,034 B2
(45) Date of Patent: Dec. 14, 2010

(54) MULTI-FUEL STORAGE SYSTEM AND METHOD OF STORING FUEL IN A MULTI-FUEL STORAGE SYSTEM

(75) Inventors: Sandeep Munshi, Vancouver (CA); Anker Gram, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 136 days.

(21) Appl. No.: 12/234,177

(22) Filed: Sep. 19, 2008

(65) Prior Publication Data

US 2009/0064586 A1    Mar. 12, 2009

Related U.S. Application Data

(63) Continuation of application No. PCT/CA2007/000430, filed on Mar. 13, 2007.

(30) Foreign Application Priority Data

Mar. 22, 2006    (CA)    .................................... 2539232

(51) Int. Cl.
| | |
|---|---|
| F17C 1/00 | (2006.01) |
| F17C 3/00 | (2006.01) |
| F17C 13/00 | (2006.01) |
| B01J 7/00 | (2006.01) |
| H01M 8/06 | (2006.01) |
| C01B 3/36 | (2006.01) |
| C10J 3/46 | (2006.01) |
| C10J 3/54 | (2006.01) |

(52) U.S. Cl. .............................. 220/560.04; 220/560.1; 220/560.12; 48/197 R; 48/61

(58) Field of Classification Search ..................... 48/61, 48/197 R; 220/560.04, 560.1, 560.11, 560.12
See application file for complete search history.

(56) References Cited

U.S. PATENT DOCUMENTS

| | | | | |
|---|---|---|---|---|
| 5,787,864 | A | * | 8/1998 | Collier et al. ................ 123/492 |
| 5,960,633 | A | | 10/1999 | Limbach |
| 6,058,713 | A | * | 5/2000 | Bowen et al. ..................... 62/7 |
| 2002/0041823 | A1 | | 4/2002 | Blaszczyk |
| 2003/0021743 | A1 | * | 1/2003 | Wikstrom et al. ........... 422/198 |
| 2007/0108096 | A1 | * | 5/2007 | Egan et al. ..................... 208/15 |

FOREIGN PATENT DOCUMENTS

EP    0114010 B1    3/1987

* cited by examiner

*Primary Examiner*—Alexa D Neckel
*Assistant Examiner*—Matthew J Merkling
(74) *Attorney, Agent, or Firm*—McAndrews, Held & Malloy, Ltd.

(57) ABSTRACT

Reduced emissions of nitrogen oxides can be achieved if engines are fuelled with mixtures of gaseous fuels such as hydrogen and natural gas. Storing the gaseous fuels separately is desirable so that the fuel mixture ratio can be changed responsive to engine operating conditions. The present apparatus increases the storage density of gaseous fuels such as hydrogen by storing them in gaseous form at high pressures and at sub-ambient temperatures. A first thermally insulated space for holding a first gaseous fuel in a liquefied form is separated from a second thermally insulated space for holding a second gaseous fuel by a thermally conductive fluid barrier. The second gaseous fuel liquefies at a lower temperature than the first gaseous fuel such that the second gaseous fuel can be stored within the second thermally insulated space in a gaseous form at a sub-ambient temperature.

11 Claims, 3 Drawing Sheets

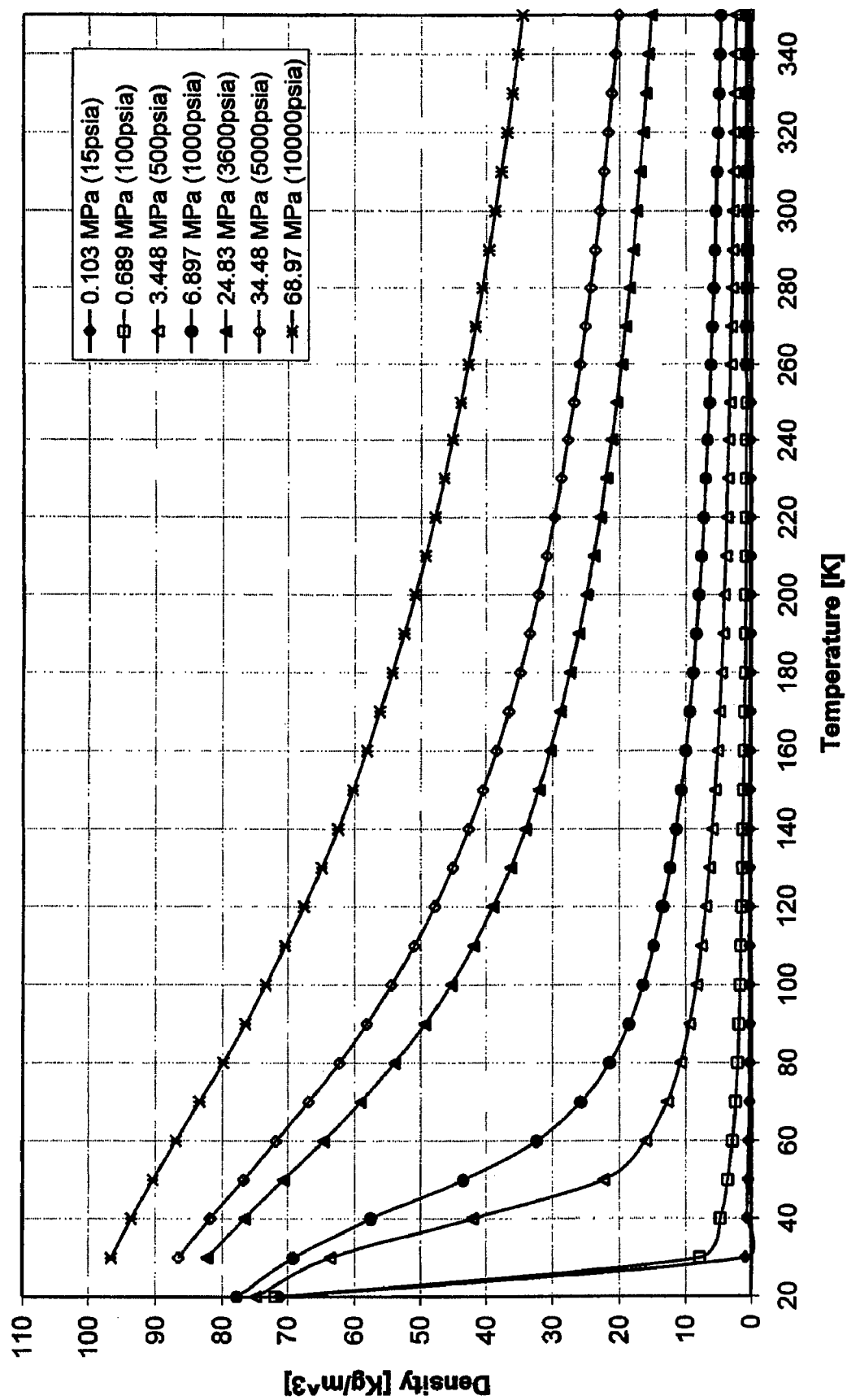

MULTI-FUEL STORAGE SYSTEM AND METHOD OF STORING FUEL IN A MULTI-FUEL STORAGE SYSTEM

CROSS-REFERENCE TO RELATED APPLICATION(S)

This application is a continuation of International Application No. PCT/CA2007/000430, having an international filing date of Mar. 13, 2007, entitled "Multi-Fuel Storage System And Method Of Storing Fuel In A Multi-Fuel Storage System". The '430 international application claimed priority benefits, in turn, from Canadian Patent Application No. 2,539,232 filed Mar. 22, 2006. The '430 international application is hereby incorporated by reference herein in its entirety.

FIELD OF THE INVENTION

The present invention relates to a multi-fuel storage system and a method of storing fuel in a multi-fuel storage system. More particularly, the invention relates to an apparatus and method for separately storing two gaseous fuels with a higher density than the same fuels when both are stored as compressed gases.

BACKGROUND OF THE INVENTION

There can be advantages gained by fuelling an engine with two different gaseous fuels and having the ability to control the mixture ratio of the two gaseous fuels. A gaseous fuel is defined herein as a fuel that is combustible in an internal combustion engine and that is in the gaseous phase at ambient temperature and pressure.

For example, hydrogen can be mixed with other fuels and burned in the combustion chamber of an internal combustion engine to lower the combustion temperature and thereby reduce the production of NOx. With an engine fuelled with a mixture of hydrogen and natural gas it is possible to extend the lean combustion limit, increase mixture burning speed, and reduce the required ignition energy compared to an engine fuelled with natural gas alone. U.S. Pat. No. 5,787,864, entitled, "Hydrogen Enriched Natural Gas as a Motor Fuel With Variable Air Fuel Ratio and Fuel Mixture Ratio Control" teaches such an approach with a fuel mixture comprising between 21% and 50% hydrogen with the remainder being natural gas. The '864 patent also teaches that the hydrogen and natural gas can be stored in separate containers and that the ratio of natural gas to hydrogen can be varied dynamically and controlled as a function of output emissions and engine power.

Compared to other fuels, hydrogen is at present more expensive so it is desirable to mix hydrogen with a less expensive fuel. If hydrogen is to be added to a fuel for a vehicular engine, an onboard source of hydrogen is required. Storage of hydrogen as a compressed gas can be a problem because of the much larger volume that is required to store a suitable amount of fuel, compared to a conventional liquid fuel with the same amount of energy. Even compared to other gaseous fuels, hydrogen has the lowest energy density. For example, at a storage pressure of about 25 MPa (about 3600 psia), and a temperature of 300 degrees Kelvin (about 27 degrees Celsius or about 80 degrees Fahrenheit), hydrogen has a density of about 17.4 kilograms per cubic meter, and the same amount of energy is available in 48.8 kilograms of diesel fuel, which occupies a volume of less than 0.06 cubic meters, or 41.8 kilograms of methane, which occupies about 0.22 cubic meters at the same storage pressure and temperature. Storage density of gaseous hydrogen can be increased by storing it at higher pressures, but this requires that the fuel tanks be built to withstand such higher pressures and this makes the storage tanks bulky, heavy, and expensive. Another consideration is that some jurisdictions impose regulations that limit the storage pressure for compressed gaseous fuels. Compared to conventional liquid fuels, the storage volume required to store hydrogen in the gaseous phase is higher, even at pressures as high as 70 MPa (about 10,150 psia), and so, for a vehicular application, it can be difficult to find space to store an adequate amount of fuel to give the vehicle a practical range between refueling.

To increase the energy density of hydrogen it is possible to store it in liquefied form. However, liquefying hydrogen is energy intensive and storage of hydrogen as a liquefied gas can also be problematic because of the very low temperatures needed to keep hydrogen in liquefied form, which, depending upon the storage pressure can be at least as low as 20 degrees Kelvin (about −253 degrees Celsius or about −424 degrees Fahrenheit). Because of the very low temperature for storing liquefied hydrogen, there are higher temperature gradients between the storage space and the ambient environment and even a small amount of heat leak into a cryogenic storage container can result in vaporization of some of the liquefied gas. When liquefied gas in a storage vessel is vaporized, if fuel is not consumed quickly enough to reduce the vapor pressure, to maintain vapor pressure below the designed pressure limits of the storage vessel it may be necessary to vent vapor from the storage vessel, which results in fuel being wasted and hydrogen being released into the environment. While technology exists to make a thermally insulated vessel to store liquefied hydrogen for workable hold times, the cost of such a vessel may not be economical for large-scale vehicular and industrial applications.

U.S. Pat. No. 6,397,790 entitled, "Octane Enhanced Natural Gas For Internal Combustion Engine" teaches using a reformer to selectively reform substantially all hydrocarbons in the natural gas except methane to provide a higher octane gaseous fuel comprised of methane, hydrogen and carbon monoxide. With this approach, the onboard source of hydrogen is the natural gas, but the addition of a reforming reactor adds complexity and cost to the fuel system. Exhaust gas from the engine's combustion chambers is directed to a reforming reactor to provide steam and heat for promoting the production of hydrogen by reforming natural gas introduced from the fuel supply into the reforming reactor. The '790 patent also discusses a number of different methods that have been proposed by others for producing hydrogen onboard a vehicle, but as noted in the '790 patent, these approaches all have disadvantages of their own.

Some research has been directed at storing hydrogen as a hydride but practical solutions using this technology have not yet been commercialized. Some of the challenges that currently face the adoption of metal hydride storage systems relate to the weight and the cost of such systems. In addition, loading and unloading can be time consuming, and impurities in the gas could act as a poison that reduces the storage capacity of the system.

It is possible to use an onboard storage vessel that holds a mixture of compressed gaseous hydrogen and natural gas. With this approach only one storage vessel is needed. However, as noted above, the energy density of hydrogen and natural gas stored in gaseous form is very low, even if the gases are stored in a pressure vessel at a high pressure. In addition, when the hydrogen and natural gas are stored as a mixture, it is not possible to control the fuel mixture ratio of hydrogen to natural gas.

Accordingly, while the addition of a second gaseous fuel, like hydrogen, to another gaseous fuel, like natural gas, that is burned in an internal combustion engine can be very helpful in reducing the production of harmful emissions, like NOx, there remain challenges associated with the practical and efficient storage of two gaseous fuels onboard a vehicle.

SUMMARY OF THE INVENTION

An apparatus is provided for separately storing and delivering a first gaseous fuel and a second gaseous fuel. The apparatus comprises a first vessel defining a first thermally insulated space that can hold the first gaseous fuel in a liquefied form; a second thermally insulated space disposed within the first vessel, wherein the second thermally insulated space is separated from the first thermally insulated space by a thermally conductive fluid barrier. The second thermally insulated space can hold the second gaseous fuel. The second gaseous fuel liquefies at a lower temperature than the first gaseous fuel, whereby the second gaseous fuel can be stored within the second thermally insulated space in a gaseous form. A first pipe in fluid communication with the first thermally insulated space extends out of the first vessel. A second pipe in fluid communication with the second thermally insulated space extends out of the first vessel.

The thermally conductive barrier preferably enables the first gaseous fuel and the second gaseous fuel to be in thermal equilibrium when stored in the respective first and second thermally insulated spaces. The first vessel can comprise a surrounding outer shell spaced from the first vessel whereby a vacuum can be applied therebetween to provide thermal insulation between the ambient environment and the first thermally insulated space.

The first thermally insulated space can be adapted to hold natural gas in liquefied form at a temperature between about 110 degrees Kelvin (−163 degrees Celsius) and 130 degrees Kelvin (−143 degrees Celsius). The second thermally insulated space can be adapted to hold hydrogen. In some embodiments the second thermally insulated space can be adapted to hold hydrogen at a pressure of at least 25 MPa (about 3600 psia), and in other embodiments the second thermally insulated space can adapted to hold hydrogen at pressures up to 70 MPa (about 10,150 psia). The storage pressure for holding the second gaseous fuel can be dictated by local regulations that can limit the maximum storage pressure for gaseous fuels.

In a preferred embodiment, the second thermally insulated space is defined by a second vessel, which is disposed within the first thermally insulated space. In another preferred embodiment, the second thermally insulated space is defined by a partition wall that divides a thermally insulated space defined by the first vessel into a first thermally insulated space and a second thermally insulated space. In yet another preferred embodiment, the second thermally insulated space can be defined in part by a pipe disposed within the first thermally insulated space. The first vessel can have an elongated axis and the pipe that defines the second thermally insulated space can be co-axial with the elongated axis of the first thermally insulated space.

The first gaseous fuel preferably comprises a hydrocarbon storable within the first thermally insulated space in liquefied form. The apparatus can further comprising a fuel processing system for reforming the first fuel to produce a gaseous stream comprising hydrogen for filling the second thermally insulated space. Such an apparatus comprises a reforming reactor operable to reform a supply of the first gaseous fuel to produce the gaseous stream comprising hydrogen, a heat exchanger, and a compressor. The reforming reactor has an inlet in communication with the first pipe for receiving the supply of the first gaseous fuel and an outlet in communication with the second pipe for delivering the gas stream comprising hydrogen to the second thermally insulated space. The heat exchanger is disposed between the first vessel and the reforming reactor, in fluid communication with the first and second pipes, and adapted to transfer heat from the gas stream comprising hydrogen to the supply of the first gaseous fuel, whereby the first gaseous fuel is vaporized and the gas stream comprising hydrogen is cooled before being delivered to the second thermally insulated space. The compressor is disposed between the outlet of the reforming reactor and the heat exchanger, whereby it compresses the gaseous stream comprising hydrogen that flows through the second pipe. The reforming reactor can further comprise a gas separation system adapted to purify the gas stream comprising hydrogen to remove a predetermine percentage of impurities therefrom to thereby achieve a specified level of hydrogen purity in the gas stream comprising hydrogen that is delivered to the second pipe from the outlet of the reforming reactor.

The disclosed apparatus can further comprise a heat exchanger with heat exchange passages in communication with the first and second pipes whereby when filling the first thermally insulated space with the first fuel and the second thermally insulated space with the second fuel, the second fuel can flow through the heat exchange passages and be cooled by the first fuel. The advantage of this arrangement is that it can reduce the time that is required to fill the second thermally insulated space with fuel because the operator need not wait for the second fuel to be cooled entirely by heat transfer between the first and second thermally insulated spaces. If a limited time is available for filling the second thermally insulated space with second fuel, then the heat exchanger can pre-cool the second fuel to allow more fuel to flow into the second thermally insulated space.

A method is provided for separately storing and delivering a first gaseous fuel and a second gaseous fuel. The method comprises liquefying a first gaseous fuel and holding it in a first thermally insulated space in liquefied form at a storage temperature below the vaporization temperature of the first gaseous fuel; pressurizing a second gaseous fuel and holding it in a second thermally insulated space at a storage pressure within a predetermined pressure range, wherein the second gaseous fuel remains in gaseous form at the storage temperature when the storage pressure is within the predetermined pressure range; cooling the second gaseous fuel by thermal transfer between the first gaseous fuel that is held within the first thermally insulated space and the second gaseous fuel that is held within the second thermally insulated space; delivering the first gaseous fuel from the first thermally insulated space on demand; and delivering the second gaseous fuel from the second thermally insulated space on demand.

A preferred method further comprises delivering the first and second gaseous fuels to an internal combustion engine. If the disclosed apparatus is employed for supplying fuel to an Otto cycle engine that introduces the fuel into the intake manifold, colder fuel temperatures associated with storing the fuel at cryogenic temperatures can be beneficial in that volumetric efficiency can be increased, since the cooler gaseous fuel occupies less volume when it is introduced into the intake manifold. In addition, the lower temperature of the fuel can result in lower combustion temperature, which results in a decrease in the amount of NOx produced by combustion in the engine.

If the first gaseous fuel is natural gas, the method can comprise storing the first fuel at a storage temperature is between 110 and 130 degrees Kelvin (between about −163 and −143 degrees Celsius). If the second gaseous fuel is hydrogen, in a preferred embodiment, the second predetermined pressure range can be between zero and 70 MPa (10, 150 psia).

The method can further comprise pre-cooling the second gaseous fuel prior to introducing the second gaseous fuel into the second thermally insulated space. The second gaseous fuel that is supplied to fill the second thermally insulated space can be delivered at a temperature that is close to ambient temperature. The first fuel that is supplied to fill the first thermally insulated space can be supplied in liquefied form and already at the desired storage temperature. According to the method, the second gaseous fuel need not be pre-cooled from ambient temperature to storage temperature, but any pre-cooling that is done can reduce the time required to cool the second fuel to storage temperature and reduce the time needed to fill the second thermally insulated space with second gaseous fuel with the desired mass density. In a preferred method, the first gaseous fuel and the second gaseous fuel can be directed to a heat exchanger in which the first gaseous fuel can be used to pre-cool the second gaseous fuel.

The method can further comprise reforming the first gaseous fuel to produce the second gaseous fuel. The advantage of this approach is that only one fuel needs to be supplied, which is particularly beneficial for example, if the apparatus that is located in a remote location. For reforming the first fuel, the method can further comprise vaporizing the first gaseous fuel in a heat exchanger before it is supplied to a reforming reactor, with heat for vaporization originating from the second gaseous fuel that is produced by the reforming reactor. In this way, the second gaseous fuel can be cooled before it is delivered to a storage vessel. Because it can require less energy to increase the pressure of a liquefied gas, compared to compressing a gas to the same pressure, the method can further comprise compressing the second gaseous fuel up to a predetermined storage pressure before it is directed to the heat exchanger. The method can further comprise processing the second gaseous fuel that is produced by the reforming reactor to purify it to remove a predetermine percentage of non-hydrogen elements therefrom to thereby achieve a specified level of hydrogen purity in the second gaseous fuel that is delivered from the reforming reactor.

BRIEF DESCRIPTION OF THE DRAWINGS

FIG. 2 additionally shows a fuel processing system that comprises a reforming reactor for processing a first fuel such as natural gas, to produce a second fuel, such as hydrogen, which can then be stored in the second storage space.

FIG. 4 is a graph that plots the density of hydrogen as a function of temperature and pressure, showing how the storage density can be improved by storing a gaseous fuel such as hydrogen at a lower temperature and at higher storage pressures.

DETAILED DESCRIPTION OF PREFERRED EMBODIMENT(S)

Figure 1:
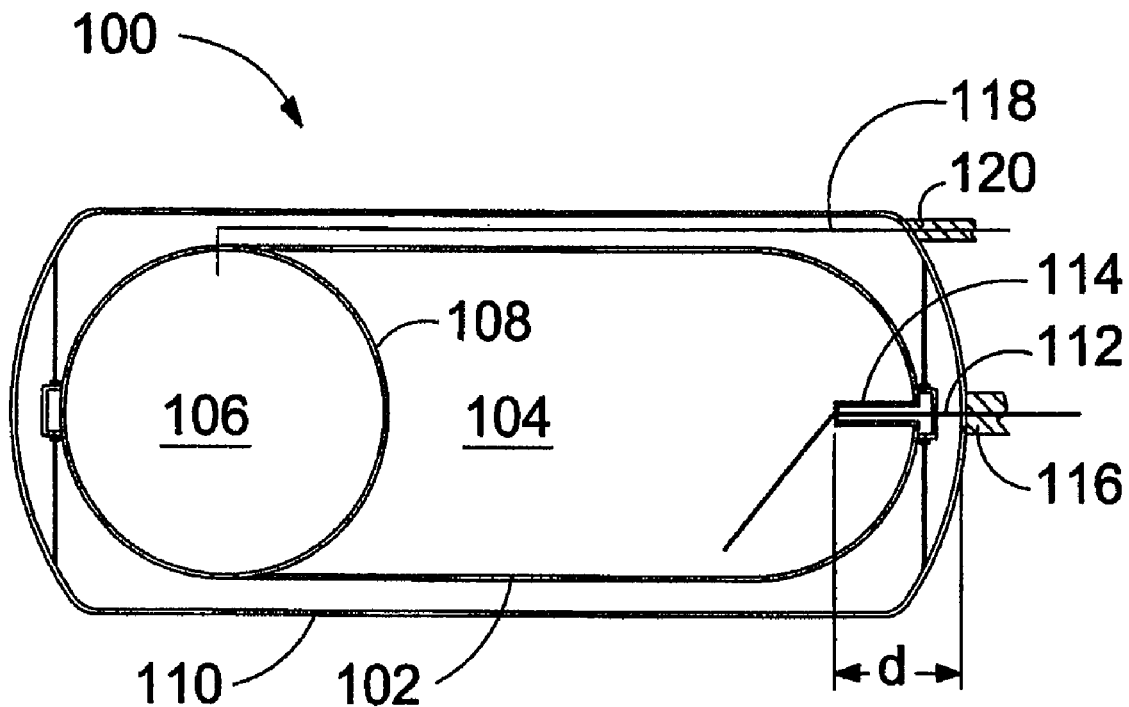
FIG. 1 is a schematic drawing illustrating an apparatus for separately storing two gaseous fuels at a cryogenic temperature in which a thermally insulated space defined by a storage vessel is partitioned into two fluidly isolated compartments. Pipes are shown through which the gaseous fuels can be respectively introduced into the thermally insulated spaces or delivered therefrom.

FIG. 1 is a schematic drawing of apparatus 100 for separately storing and delivering a first gaseous fuel and a second gaseous fuel. Apparatus 100 comprises first vessel 102, which defines first thermally insulated space 104 in which the first gaseous fuel can be stored in liquefied form. Second thermally insulated space 106, which can hold the second gaseous fuel, is disposed within first vessel 102. Second thermally insulated space 106 is separated from first thermally insulated space 104 by thermally conductive barrier 108. The second gaseous fuel liquefies at a lower temperature than the first gaseous fuel so that the second gaseous fuel can be stored within second thermally insulated space 106 in a gaseous form. While both first and second thermally insulated spaces 104 and 106, are respectively thermally insulated from the ambient temperature outside outer shell 110, thermally conductive barrier 108 is a partition wall that divides the space inside vessel 102 into first and second thermally insulated spaces 104 and 106 while allowing heat transfer therebetween. In preferred embodiments, when a first gaseous fuel is held in first thermally insulated space 104 and a second gaseous fuel is held in second thermally insulated space 106, a thermal equilibrium is established between them and the temperatures of the first and second gaseous fuels are substantially equal.

A vacuum formed between outer shell 110 and vessel 102 can provide some of the thermal insulation for thermally insulated spaces 104 and 106. To reduce heat transfer into the thermally insulated spaces by thermal conduction through supports that span between outer shell 110 and vessel 102, such supports can be made from non-metallic members with high structural strength and low thermal conductivity. As shown in the accompanying drawings it is also desirable to reduce heat transfer through the supports by lengthening the heat transfer path, by using supports that are attached to vessel 102 tangentially rather than perpendicularly. Preferred arrangements for supporting a vessel such as vessel 102 inside an outer shell, such as outer shell 110, are disclosed in co-owned Canadian Patent No. 2,441,641 and co-owned U.S. patent application Ser. No. 10/950,305 (published as US 2005/0139600 A1), both entitled "Container For Holding A Cryogenic Fluid".

Similarly, the heat transfer path provided by piping can be lengthened to reduce heat transfer from the ambient environment to thermally insulated spaces 104 and 106. As shown in FIG. 1, pipe 112 is in fluid communication with thermally insulated space 104 and extends out from vessel 102 and outer shell 110. Pipe 112 passes through the vacuum space and through sleeve 114 so that the heat conduction path from where pipe 112 is attached to outer shell 110 to where pipe 112 is attached to sleeve 114 is distance d rather than the shorter heat transfer path that would conduct more heat into thermally insulated space 104 if sleeve 114 were not employed. Pipe 112 is shown in this embodiment being thermally insulated where it extends outside outer shell 110. Only a representative amount of thermal insulation 16 is shown in FIG. 1, but insulation 116 can cover pipe 112 until the first fuel is delivered to a pump or a vaporizer.

Pipe 118 is in fluid communication with second thermally insulated space 106 and extends out from vessel 102 and outer shell 110. Pipe 118 conveys the second gaseous fuel, and in this embodiment a sleeve is not required to extend the heat transfer path since the pipe can follow an elongated path through the vacuum space before it passes through outer shell 110. Like pipe 112, pipe 118 can also be provided with insulation 120 where it extends from outer shell 110.

The second gaseous fuel that is stored in gaseous form in thermally insulated space 106 can be stored at higher pressures that the first gaseous fuel that is stored in liquefied form in thermally insulated space 104. A spherical shape for thermally insulated space 106 can be employed since this shape is structurally strong and the second gaseous fuel can be stored at pressures as high as 70 MPa (about 10,150 psia).

In a preferred embodiment, first thermally insulated space 104 is adapted for holding natural gas in liquefied form at a temperature between about 110 degrees Kelvin (about −163 degrees Celsius) and 130 degrees Kelvin (about −143 degrees Celsius), and second thermally insulated space 106 is adapted to hold hydrogen. Even at pressures as high as 70 MPa hydrogen remains in the gaseous phase at such temperatures, but depending upon the storage pressure, at the same pressure, hydrogen density can be more than double its density at ambient temperatures.

Two other embodiments of an apparatus for separately storing and delivering a first gaseous fuel and a second gaseous fuel are illustrated. Like features that function in substantially the same manner are labeled with reference numbers that are increased by increments of 100.

Figure 2:
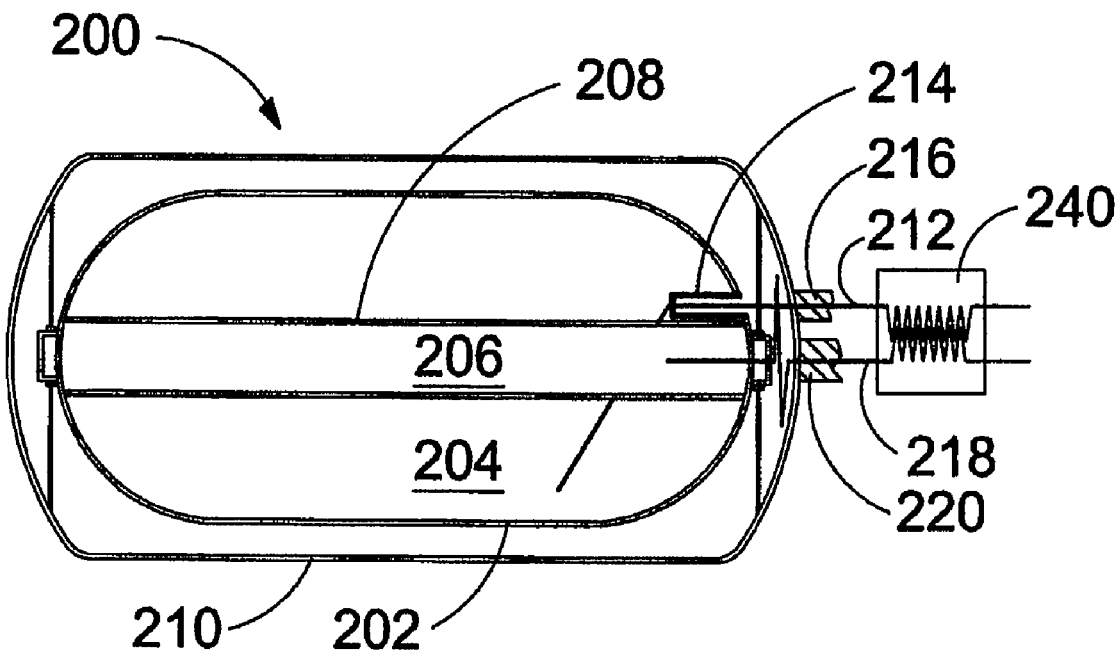
FIG. 2 is a schematic drawing illustrating a second embodiment of an apparatus for separately storing two gaseous fuels at a cryogenic temperature and delivering such fuels therefrom. In this embodiment a thermally insulated storage vessel defines a thermally insulated storage space, and a pipe disposed in the thermally insulated storage space defines, in part, a second storage space fluidly isolated from the thermally insulated storage space.

FIG. 2 is a schematic drawing of apparatus 200, which illustrates a second embodiment of an apparatus for separately storing and delivering two gaseous fuels. Like the embodiment of FIG. 1, in this embodiment thermally insulated storage vessel 202 defines a first thermally insulated storage space 204, and second thermally insulated storage space 106 is defined in part by pipe 208 which is disposed inside vessel 202. The ends of pipe 208 are closed by vessel 202. For ease of manufacturing pipe 208 is preferably co-axially aligned with the longitudinal axis of elongated vessel 202, but in other embodiments pipe 208 could be offset from this axis, for example to avoid interfering with a pump installed inside vessel 202. Outer shell 210 is spaced from vessel 202 so that a vacuum can be formed in the space therebetween to provide thermal insulation for vessel 202. Pipe 212, sleeve 214 and insulation 216 are substantially the same as like numbered components 112, 114, and 116 of FIG. 1, except that they are offset from the centerline of vessel 202 since the center of vessel 202 is occupied by second thermally insulated space 206 and pipe 212 is in fluid communication with first thermally insulated space 204. Pipe 218 is in fluid communication with second thermally insulated space 206 and is covered with insulated 220 where it extends from outer shell 110. Pipe 218 can be coiled as schematically shown in the space between vessel 202 and outer shell 110 to provide a longer heat transfer path through pipe 218.

Heat exchanger 240 is an additional feature that is shown in the embodiment of the apparatus that is illustrated FIG. 2. If the second gaseous fuel, which is stored in second thermally insulated space 206, is not supplied already at a cryogenic temperature, heat exchanger 240 can be employed to pre-cool the second gaseous fuel before it is introduced into second thermally insulated space 206. This can reduce the time required to fill second thermally insulated storage space 206 and/or reduce the energy that is needed to complete the re-filling procedure. Without pre-cooling the second gaseous fuel, it can take longer for the second gaseous fuel to be cooled inside second thermally insulated space 206. If a heat exchanger is not employed and there is insufficient time during re-filling to fully cool the second gaseous fuel inside second thermally insulated space 206, then such conditions can result in reduced storage density since the temperature of the second gaseous fuel is not as low as the temperature of the first (liquefied) gaseous fuel and lower storage temperatures allow higher storage densities. Heat exchanger 240 can be part of an on-board apparatus or it can be part of the apparatus associated with a re-filling station. While heat exchanger 240 is shown in FIG. 2 and not FIG. 1, a heat exchanger is an optional feature that can be employed with any and all embodiments of the disclosed apparatus.

Figure 3:
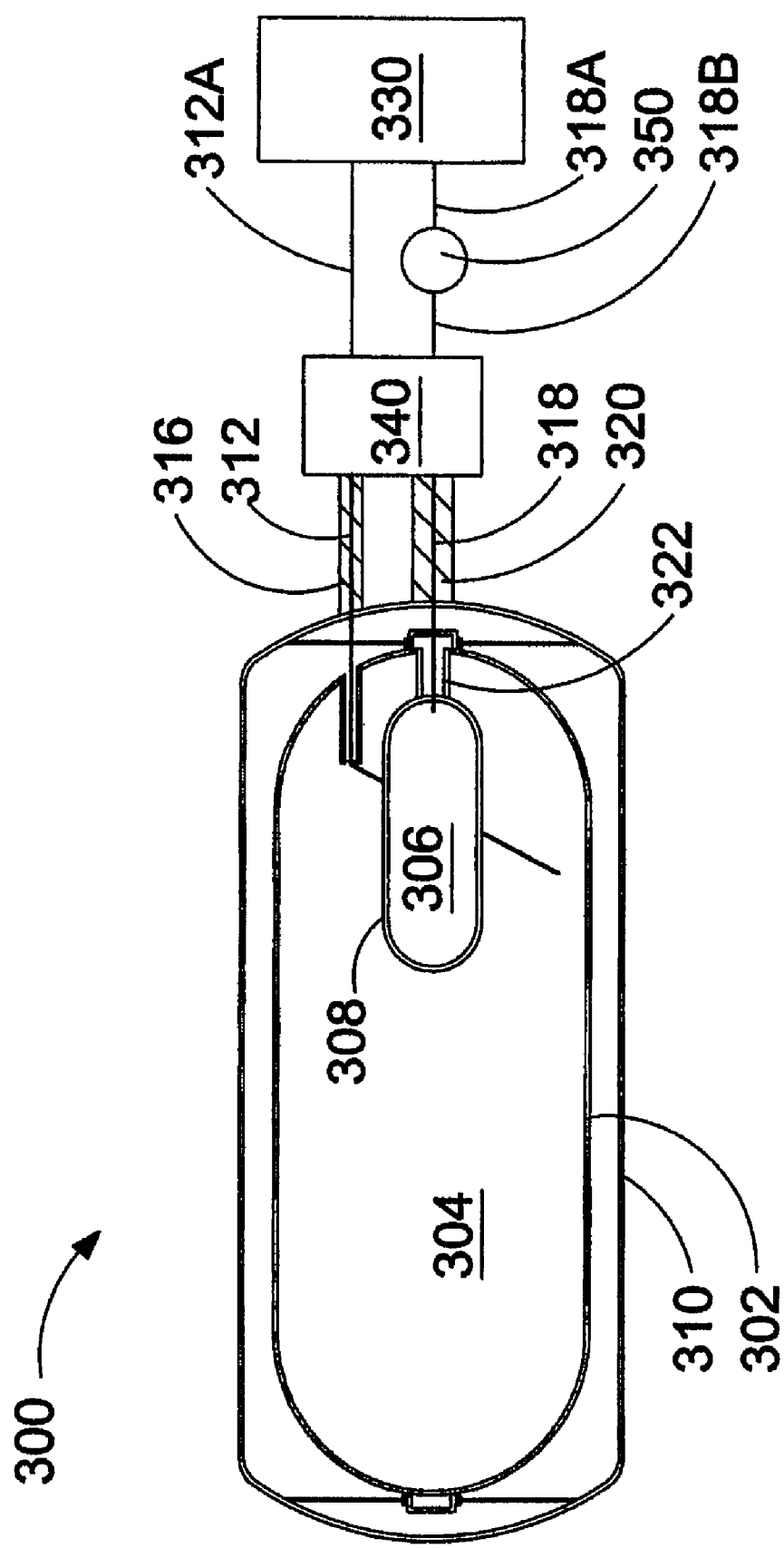
FIG. 3 is a schematic drawing illustrating a third embodiment of an apparatus for separately storing two gaseous fuels at a cryogenic temperature and delivering such fuels therefrom. In this third embodiment, a thermally insulated storage vessel defines a thermally insulated space with an uninsulated storage vessel defining a second storage space within the thermally insulated storage space that is fluidly isolated from the thermally insulated storage space.

FIG. 3 is a schematic drawing of apparatus 300, which illustrates a third embodiment of an apparatus for separately storing and delivering two gaseous fuels. In this third embodiment, thermally insulated storage vessel 302 defines thermally insulated space 304 with second thermally insulated space 306 defined by uninsulated second storage vessel 308. Outer shell 310 acts like outer shells 110 and 210 in the previously described embodiments. In this embodiment, sleeve 322 provides support for second storage vessel 308 while also providing an extended heat transfer path along pipe 318 from outer shell 310 to inner vessel 302.

FIG. 3 additionally shows a fuel processing system that comprises reforming reactor 330 for processing a first gaseous fuel, which comprises a hydrocarbon, such as natural gas, to produce the second gaseous fuel, such as hydrogen, which can then be stored in second thermally insulated space 306. Since the second gaseous fuel can be produced from the first gaseous fuel, the volume of second vessel 308 need not be as large as it is in the other illustrated embodiments since the second fuel consumed by the end user can be replenished as long as there is an adequate supply of the first gaseous fuel in thermally insulated space 304. The first gaseous fuel is supplied from first thermally insulated space 304 via pipe 312, which is covered with insulation 316 where it extends from outer shell 310 to a first inlet of heat exchanger 340. After being warmed and vaporized by heat exchanger 340, the first gaseous fuel flows through pipe 312A to reforming reactor 330. Reforming reactor 330 is operable to produce a gaseous stream comprising hydrogen from the supplied first gaseous fuel. The gaseous stream comprising hydrogen can be discharged from an outlet of reforming reactor 330 to pipe 318A which conveys the second gaseous fuel produced by reforming reactor 330 to compressor 350, which can pressurize the second gaseous fuel up to a predetermined storage pressure to increase storage density in second storage vessel 308. Before the second gaseous fuel is delivered to second storage vessel 308 it is pre-cooled in heat exchanger 340 by transferring heat from the second gaseous fuel to the first gaseous fuel that is supplied to reforming reactor 330 from first thermally insulated space 304. This provides an efficient arrangement for heating and vaporizing the first gaseous fuel that is delivered to reforming reactor 330 and cooling the second gaseous fuel that is delivered to second storage vessel 308.

Reforming reactor 330 can further comprise a gas separation system adapted to purify the gaseous stream comprising hydrogen that is to become the second gaseous fuel. The gas separation system can be adapted to purify the gas stream comprising hydrogen by removing at least a predetermined percentage of impurities therefrom to thereby achieve a specified level of hydrogen purity in the second gaseous fuel. Using any one of the disclosed embodiments of the apparatus, a method can be followed for separately storing and delivering a first gaseous fuel and a second gaseous fuel with improved storage density. The method comprises liquefying a first gaseous fuel and holding it in first thermally insulated space 104, 204, 304, in liquefied form at a storage temperature below the vaporization temperature of the first gaseous fuel; pressurizing a second gaseous fuel and holding it in second thermally insulated space 106, 206, 306, at a storage pressure within a predetermined pressure range, wherein the second gaseous fuel remains in gaseous form at the storage temperature when the storage pressure is within the predetermined pressure range; cooling the second gaseous fuel by thermal transfer between the first gaseous fuel that is held within the first thermally insulated space and the second gaseous fuel that is held within the second thermally insulated space; delivering the first gaseous fuel from the first thermally insulated space on demand; and delivering the second gaseous fuel from the second thermally insulated space on demand. In a preferred embodiment, the first and second gaseous fuels are delivered to an internal combustion engine where they are combusted in the engine's combustion chambers.

In preferred embodiments, the first gaseous fuel is natural gas, which can be stored within first thermally insulated space 104, 204, 304, in liquefied form at a storage temperature between 110 and 130 degrees Kelvin (between about −162 and −143 degrees Celsius). The second gaseous fuel can comprise hydrogen, which can be stored within second thermally insulated space 106, 206, 306, in gaseous form at a storage pressure between zero and 70 MPa (about 10,150 psia).

The method can further comprise reforming the first gaseous fuel in reforming reactor 330 to produce the second gaseous fuel. In this embodiment of the method, the produced second gaseous fuel can be pre-cooled in heat exchanger 340 prior to being delivered to the second thermally insulated space 106, 206, 306, by transferring heat to the first fuel that is delivered to reforming reactor 330. That is, the method can comprise vaporizing the first gaseous fuel in heat exchanger 340 before it is supplied to reforming reactor 330, with heat for vaporization originating from the second gaseous fuel that is produced by reforming reactor 330. Cooling the second gaseous fuel in heat exchanger 340 and by storage inside second storage vessel 308 lowers the storage temperature of the second gaseous fuel and increases storage density. In addition, the second gaseous fuel is preferably compressed by compressor 350 up to a predetermined storage pressure before it is directed to heat exchanger 340, to further improve storage density inside second storage vessel 308. The method can further comprise processing the second gaseous fuel to purify it to remove a predetermined percentage of non-hydrogen elements therefrom to thereby achieve a specified level of hydrogen purity in the second fuel that is delivered from reforming reactor 330.

FIG. 4 is a graph that plots the density of normal hydrogen as a function of temperature and pressure. The graph in FIG. 4 shows how much the storage density can be improved by storing a gaseous fuel such as hydrogen at a lower temperature and at higher storage pressures. While conventional hydrogen storage vessel rely upon higher storage pressures to increase storage density, what is surprising is how much storage density can be improved by lowering the storage temperature. In other applications that require hydrogen storage, there is typically not also storage of a second fluid at a cryogenic temperature, so it is normally not feasible to store hydrogen at such low temperatures. Graph 4 shows that if the storage pressure is about 25 MPA (3600 psia) at 280 degrees Kelvin (about 7 degrees Celsius), hydrogen density is under 20 kilograms per cubic meter, whereas at the same storage pressure, if the storage temperature is 110 degrees Kelvin (about −163 degrees Celsius), hydrogen density is higher than 40 kilograms per cubic meter. Accordingly, by storing hydrogen at a temperature of 110 degrees Kelvin instead of 280 degrees Kelvin, the storage capacity for a given volume can be more than doubled. For a storage pressure of about 69 MPa (10,000 psia), the slope is shallower, but over the same temperature range hydrogen density can still be dramatically improved from about 40 kilograms per cubic meter to about 70 kilograms per cubic meter.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of separately storing and delivering a first gaseous fuel and a second gaseous fuel, said method comprising
    (a) liquefying the first gaseous fuel and containing said first fuel in liquefied form in a first space thermally insulated from the ambient environment at a storage temperature below said first fuel vaporization temperature;
    (b) pressurizing the second gaseous fuel and containing said second fuel in a second space thermally insulated from the ambient environment and within said first space at a storage pressure within a predetermined pressure range, said second fuel remaining in gaseous form at said storage temperature when said storage pressure is within said predetermined pressure range;
    (c) cooling said second fuel by thermal transfer between said first fuel contained within said first space and said second fuel contained within said second space;
    (d) delivering said first fuel from said first space on demand; and
    (e) delivering said second fuel from said second space on demand.

2. The method of claim 1 further comprising:
    (f) delivering said first and second fuels to an internal combustion engine.

3. The method of claim 1 wherein said first gaseous fuel is natural gas and said storage temperature is between 110 and 130 degrees Kelvin (between about −163 and −143 degrees Celsius).

4. The method of claim 3 wherein said second gaseous fuel is hydrogen and said second predetermined pressure range is between zero and 70 MPa (10,150 psia).

5. The method of claim 1 further comprising reforming said first fuel to produce said second gaseous fuel.

6. The method of claim 5 further comprising vaporizing said first fuel in a heat exchanger before said first fuel is supplied to a reforming reactor, wherein heat for vaporizing said first fuel originates from said second fuel produced by said reforming reactor, whereby said second fuel is cooled before delivery to said second space.

7. The method of claim 6 further comprising compressing said second fuel to a predetermined storage pressure before said second fuel is directed to said heat exchanger.

8. The method of claim 5 further comprising purifying said second fuel to remove a predetermine percentage of non-hydrogen constituents therefrom, thereby achieving a predetermined level of hydrogen purity in said second fuel discharged from said reforming reactor.

9. The method of claim 1 further comprising pre-cooling said second fuel prior to introducing said second fuel into said second space.

10. The method of claim 9 wherein said first fuel pre-cools said second fuel.

11. The method of claim 1 wherein the temperature of the gaseous second fuel in the second space is essentially the temperature of the liquefied first fuel in the first space.

* * * * *